US006271335B1

(12) United States Patent
Small et al.

(10) Patent No.: US 6,271,335 B1
(45) Date of Patent: Aug. 7, 2001

(54) METHOD OF MAKING THERMALLY REMOVABLE POLYMERIC ENCAPSULANTS

(75) Inventors: James H. Small, Santa Fe; Douglas A. Loy, Albuquerque; David R. Wheeler, Albuquerque; James R. McElhanon, Albuquerque; Randall S. Saunders, deceased, late of Albuquerque, all of NM (US), by Marvie Lou Durbin-Voss, legal representatiave

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/484,838

(22) Filed: Jan. 18, 2000

(51) Int. Cl.$^7$ ......................... C08G 73/00; C08F 283/00; B29B 13/00
(52) U.S. Cl. ......................... 528/170; 528/310; 528/322; 528/332; 528/405; 528/425; 525/471; 525/502; 264/272.11
(58) Field of Search ..................................... 528/405, 425, 528/170, 310, 322, 332; 264/272.11

(56) References Cited

U.S. PATENT DOCUMENTS

| 5,491,210 | 2/1996 | Onwumere et al. | 528/28 |
| 5,641,856 | 6/1997 | Meurs | 528/310 |
| 5,726,391 | 3/1998 | Iyer et al. | 174/52.2 |
| 5,760,337 | 6/1998 | Iyer et al. | 174/52.2 |
| 5,840,215 | * 11/1998 | Iyer et al. | 252/500 |
| 5,912,282 | * 6/1999 | Iyer et al. | 523/176 |
| 5,973,052 | * 10/1999 | Iyer et al. | 524/440 |

OTHER PUBLICATIONS

Laita, H., Boufi, S., and Gandini, A., "The application of the Diels–Alder reaction to polymers bearing furan moieties. 1. Reactions with maleimidies," Eur. Polym. J., 1997, 33, 8, 1203–1211.

* cited by examiner

Primary Examiner—P. Hampton-Hightower
(74) Attorney, Agent, or Firm—Elmer A. Klavetter

(57) ABSTRACT

A method of making a thermally-removable encapsulant by heating a mixture of at least one bis(maleimide) compound and at least one monomeric tris(furan) or tetrakis(furan) compound at temperatures from above room temperature to less than approximately 90° C. to form a gel and cooling the gel to form the thermally-removable encapsulant. The encapsulant can be easily removed within approximately an hour by heating to temperatures greater than approximately 90° C., preferably in a polar solvent. The encapsulant can be used in protecting electronic components that may require subsequent removal of the encapsulant for component repair, modification or quality control.

13 Claims, 2 Drawing Sheets

| | Compound Designation |
|---|---|
|  | 1A |
|  | 2A |
|  | 3A |
|  | 4A |
|  | 5A |

| | Compound Designation |
|---|---|
|  | 1B |
|  | 2B |
|  | 3B |
|  | 4B |
|  | 5B |
|  | 6B |

METHOD OF MAKING THERMALLY REMOVABLE POLYMERIC ENCAPSULANTS

This invention was made with Government support under Contract No. DE-AC04-94AL85000 awarded by the Department of Energy. The Government has certain rights in the invention.

BACKGROUND OF THE INVENTION

The invention relates to thermally removable, annealable, polymeric encapsulants and conformal coatings. More particularly, the invention relates to thermally removable, polymeric encapsulants prepared using the Diels-Alder cycloaddition reaction and their method of making.

Polymeric encapsulant materials, as both solids and foams, are used for a wide variety of applications due to their physical, mechanical, and electrical properties to give an encapsulated component structural support and protection from adverse environments. In some applications, for purposes such as recovery, analysis, and replacement, removal of the encapsulant (or conformal coating) from a component without damaging the device becomes necessary. Current techniques, such as those used for traditional epoxy and urethane foams, involve labor-intensive mechanical removal, thereby posing a substantial threat for component damage during encapsulant removal as well as increased expense for such labor intensive methodologies.

The mechanical stability of the polymeric encapsulant materials is usually associated with the fact that the polymeric material is crosslinked. Crosslinking is can be achieved in a number of ways. Typically, a polymeric or oligomeric material can have pendent groups that are linked together directly or with the help of other linking agents. The other common method of generating networks is to use two monomers with complimentary functionality and functionality greater than two per monomer. One type of functional group, A, reacts and condenses with another type of functional group, B, to form a new chemical group, the adduct. For instance, if A and B represent functionality that can form a bond, then a network can be formed from a monomer with 2 A funtionalities, (termed $A_2$) and a monomer with greater than two B functionalities (for example three B groups in a monomer would be termed $B_3$). An optimized stoichiometry would be N equivalents of $A_M$ and M equivalents fo $B_N$. An important advantage of using small molecules in the network are that the depolymerized network will have increased solubility and decreased viscosity relative to a network using undepolymerizable polymer/oligomer and depolymerizable crosslinks.

Diels-Alder reactions between a diene and a dienophile, typically reversible, are known and potentially useful in forming cross-linked materials. The rate of reaction between a diene and dienophile is determined by the diene and dienophile used. Likewise the rate of the reverse reaction (for depolymerization) is also determined by the individual components and the substituents on them. Typically, upon heating, the position of the equilibirum between adduct, and dienophile/diene shifts to increase the amount of the diene and dienophile. As shown as follows, the reversible Diels-Alder reaction of a maleimide, the dienophile, with functional group R, and a furan, the diene, with functional group R', is known to proceed forward rapidly at 60° C.; however, at a higher temperature, depending upon the particular reactants used, the equilibrium shifts to regenerate the maleimide and furan groups.

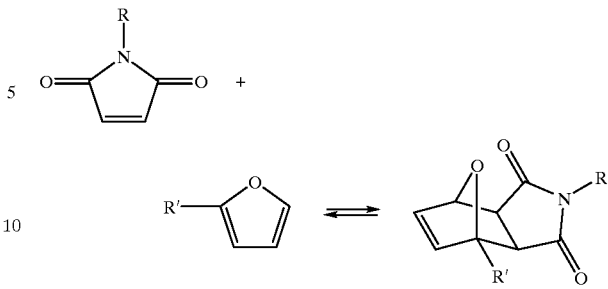

A wide variety of functional groups are tolerated by the Diels-Alder reaction. In general, any organic functional group can be used for R or R' where the functional group does not undergo a preferential Diels-Alder reaction.

Meurs (U.S. Pat. No. 5,641,856, issued on Jun. 24, 1997) describes a remoldable cross-linked resin obtained from reacting a dienophile and a 2,5-dialkylsubstituted furan. The furans are substituted at both the 2 and 5 positions to prevent unwanted side reactions that cause irreversible crosslinking; the furans may also be substituted at the 3 and 4 positions with alkyl or alkyloxy groups. Meurs utilizes polymeric furans as the diene compounds; as polymeric solids, the reaction temperatures must be sufficiently high to allow mixing of the reactants. As shown in the examples of Meurs, the reaction temperature is 150° C. or higher. The remolding is carried out at a temperature above 80° C., more preferably above 110C., and in particular above 140° C. The higher reaction temperature required by using solids as reactant is a significant disadvantage.

Iyer and Wong (U.S. Pat. No. 5,760,337, issued on Jun. 2, 1998, and U.S. Pat. No. 5,726,391, issued on Mar. 10, 1998) describe thermally reworkable binders for semiconductor devices wherein the reworkable binders comprise a crosslinked resin produced by reacting at least one dienophile with a functionality greater than one with at least one 2,5-dialkyl substituted furan-containing polymer with a filler material. lyer and Wong ('391) also discuss that the furans are substituted at both the 2 and 5 positions to prevent unwanted side reactions that cause irreversible crosslinking. As in Meurs, polymeric furans are utilized as the diene compounds; as polymeric solids, the reaction temperatures must be sufficiently high to allow mixing of the reactants. Due to the viscosity of the polymeric furans, the reworking temperature of this system is 100° C. and preferably from about 130° C. to about 250° C.

Thermally reversible curing system with lower curing and reworking temperatures would be useful in certain applications, such as in microelectronics applications where encapsulation at high temperatures might degrade the components. Useful also would be reactants that are liquid at or near room temperature to provide easier encapsulation processing. This also facilitates de-encapsulation.

SUMMARY OF THE INVENTION

According to the present invention, a method of making a thermally-removable encapsulant is provided, comprising the steps of mixing at least one bis(maleimide) compound to at least one monomeric tris(furan) or tetrakis(furan) compound to form a mixture that, heating the mixture to a temperature less than approximately 90° C. to form a gel and cooling the gel to form a solid encapsulant. According to the method of the present invention, the solid encapsulant has the property that subsequent heating to a temperature greater than approximately 90° C. will depolymerize the solid.

In one embodiment of the invention, the mixture formed by the reactants are liquids at temperatures less than approximately 60° C. and therefore can be intimately mixed to easily react within minutes to form the gel and subsequent encapsulant. The solid encapsulant can be depolymerized by placing the encapsulant in a polar solvent at a temperature of greater than approximately 90° C. for approximately an hour or moie, thereby, effectively degrading the polymer into its monomeric components. Thus, the need for physical means of removal of the encapsulant is eliminated. For uses for electronic components, the method of the present invention provides an easy, quick and efficient method of providing an encapsulant to protect the component from adverse environments while preserving means to access the electronic component at a later time by simply thermally-removing the solid encapsulant without concern about damage to the electronic component.

DESCRIPTION OF SPECIFIC EMBODIMENTS

In Diels-Alder chemistry, both a diene and dienophile are required to make an adduct. This adduct is thermally reversible at mild temperatures when appropriate dienes and dienophiles are used. According to the present invention, a thermally- reversible or thermally removable encapsulant, or polymer network, is prepared by mixing at least one bis(maleimide) compound and at least one monomer compound containing multiple furan groups, and more particularly, a monomeric tris(furan) or a tetrakis(furan). Both the bis(maleimide) and the furan compounds are preferably liquids at a temperature of less than 60° C. and more preferably at less than approximately room temperature. However, one reactant compound can be a solid at 60° C. if it is soluble in one of the other reactants such that the mixture is a liquid at approximately 60° C.

The bis(maleimide) according to the present invention is of the general structure

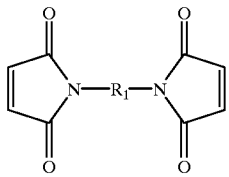

where $R_1$ is any organic group that does not undergo a preferential Diels-Alder reaction and preferably such that the bis(maleimide) remains as a liquid at approximately 60° C. or less, and more preferably is a liquid at approximately room temperature.

The tris(furan) has three furans attached to a resin; the tetrakis(furan) has four furans attached to a resin. Preferably, both the diene, the monomeric furan, and the dienophile, the bis(maleimide), are liquids near room or slightly elevated temperatures in the present invention or are soluble in one of the other reactants such that the mixture of the bis(maleimide and furan compounds is a liquid at approximately 60° C. While preparation of encapsulants with one or more components in the solid phase at room temperature is possible, the reaction must be done under high temperature conditions because these higher temperatures are required to liquefy and solubilize the reactants prior to reaction. This can be troublesome and limit the time between mixing and use. In the present invention, the mixture of the preferred reactants are liquids at temperatures less than 60° C. and the bis(maleimide) and monomeric furan compounds can therefore be intimately mixed and reacted at temperatures from approximately 60° C. to approximately 90° C. to rapidly polymerize and encapsulate a component. Any curing temperature below 90° C. is acceptable. Elevated temperatures (60–89° C.) will, however, promote a faster cure rate.

Figure 1:
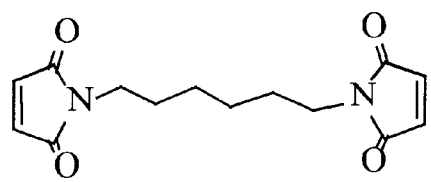
FIG. 1 shows typical bis(maleimide) compounds that can be used in the present invention.
Figure 1:
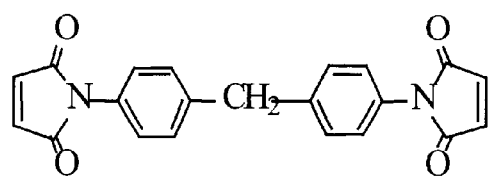
Figure 1:
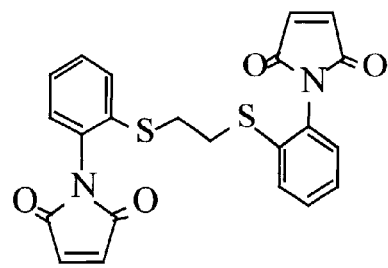
Figure 1:
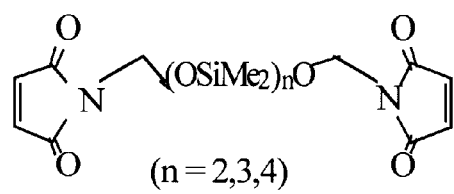
Figure 1:
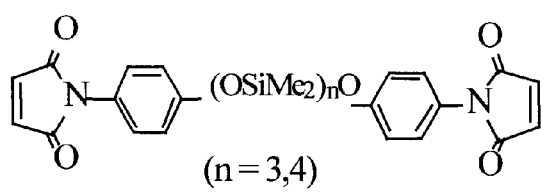

Most commercially-available bis(maleimides) are solids at room temperatures. A series of bis(maleimide) compounds that were synthesized for use in the present invention are shown in FIG. 1. The compounds are designated as 1A, 2A, 3A, 4A (n=2,3,4) and 5A (n=3,4), where n indicates the number of times the specified unit is repeated. For convenience, these identification labels are used to designate the specified compounds throughout this Specification, including the claims. Compounds 1A, 2A, 3A, and 4A (n=2,3,4) are known in the art. Compound 5A (n=3,4) is considered to be novel and was synthesized as described in the Examples for the method of the present invention. With these reactant compounds shown in FIG. 1, the formed encapsulant will depolymerize at approximately 90° C. or higher, allowing an encapsulated component to be removed or the encapsulant reworked.

Although any bis(maleimide) compound or compounds can be utilized in the present invention if they are liquid at 60° C., investigations of the rate of the Diels-Alder reaction with furfuryloxy-derived furans revealed that the bis(maleimide) compounds shown in FIG. 1 reacted rapidly (within minutes) with the monomeric tris- and tetrakisfurans at approximately 60° C. to give a polymeric crosslinked encapsulant. A reaction temperature higher than 60° C. would decrease the reaction time. Bis(maleimide) compound 5A is preferred in the present invention because the benzerie ring directly attached to the maleimide improves the reaction kinetics of the maleimide, and elevates the glass transition temperature of the cured polymer network. Additionally, compound 5A (n=3) is a liquid at less than approximately 30° C. and compound 5A (n=4) is a liquid at a temperature less than approximately 60° C. Another important feature of the present invention is that more than one bis(maleimide) compound can be used in preparing the crosslinked encapsulant. More than one bis(maleimide) compound can be used to aid in tailoring the characteristics of the reaction and the resulting encapsulant.

Figure 2:
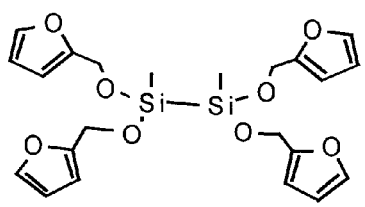
FIG. 2 shows typical monomeric furan compounds that can be used in the present invention.
Figure 2:
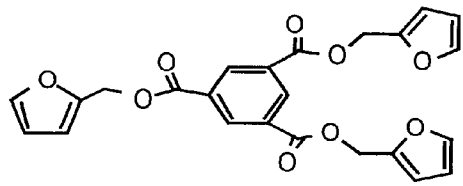
Figure 2:
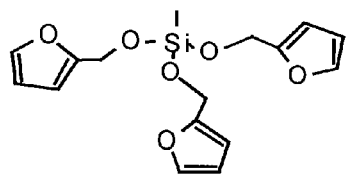
Figure 2:
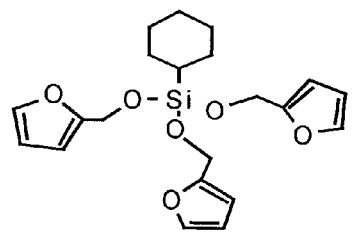
Figure 2:
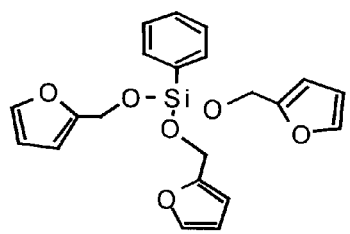
Figure 2:
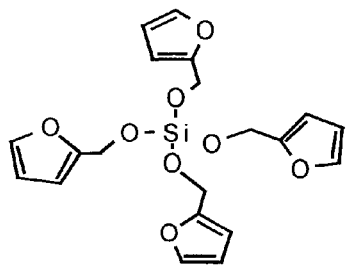

Importantly, according to the present invention, only monomeric furans are used in the reaction with the bis(maleimide) compounds to form the polymeric crosslinked encapsulant. However, as clear to those skilled in the art, the multifunctional diene need not be limited to just 2-substituted furans. However, due to their ease of manipulation and functionalization and economic suitability, 2-substituted furans, especially those derived from 2-furfuryl alcohol are especially attractive. Examples of tris(furans) and tetrakis(furans) that can be used in the present invention include, but are not limited to, the compounds shown in FIG. 2. For convenience, the compounds listed in FIG. 2 are designated by the labels 1B, 2B, 3B, 4B, 5B, and 6B. The preferred compounds, such as 3B, 4B, 5B, and 6B, are those that are liquids at less than 60° C. and are made from relatively inexpensive starting materials.

According to the present invention a method is provided of making a polymeric, thermally removable encapsulant by mixing at least one bis(maleimide) with at least one monomeric furan at less than approximately 90° C. and preferably less than 60° C. Preferred are reactants in which a polymeric network is formed within approximately 10 minutes. The polymeric network formed can be depolymerized at approximately 90° C. Depolymerization experiments demonstrated that the solid crosslinked polymeric network dissolves completely into a polar solvent, such as N,N-dimethylacetamide, within approximately 1 hr upon warming to 90° C.

Any polar solvent that can be heated to 90° C. or higher will promote the retro Diels-Alder reaction. The solvent should be able to dissolve each of the monomeric components as the Diels-Alder adducts are dissociated. Suitable solvents include n-butanol, N,N-dimethylacetamide (DMAC), methyl sulfoxide (DMSO), and N,N-dimethylformamide (DMF).

To demonstrate the utility of the present invention, computer chips were successfully encapsulated according to the present invention and then the encapsulant removed with no damage to the electronic component.

Due to the insoluble nature of the polymers, solid state characterization techniques were required to evaluate the materials. Analysis of a $^{13}$C CP MAS NMR spectra of a typically cured system revealed that the Diels-Alder cycloaddition reaction occurred in high yield to afford the polymer network. Two olefinic carbons that appeared at 110 and 108 ppm in the spectrum of the furan-containing monomer (associated with the furan group) were almost completely absent, replaced by two new peaks corresponding to the bridgehead carbons of the new 7-oxa-norbornene structure. This indicated that the curing proceeded to near completion. Also, a new peak appeared at 48 ppm which corresponded to the sp$^3$ carbons that are formed from olefinic carbons in the maleimide group of the curing agent that participate in the Diels-Alder reaction.

The properties of the cured materials can adjusted by employing monomers with different organic functionalities. Tris(furfuryloxy)organosilanes 3B, 4B, and 5B were prepared by the reaction of organosilyl trichlorides with furfuryl alcohol. They were produced as slightly viscous oils in fair to excellent yields (38–94%). Gels formed from 3B, 4B and 5B with 5A (n=4) had different properties. Likewise the properties and curing rates of the networks can be influenced by the bis(maleimides).

Thermal characterization experiments (DSC, TGA, and TMA) have been undertaken on the three cured systems: 5A (n=4)/3B, 5A (n=4)/4B, and 5A (n=4)/5B. Differential scanning calorimetry (DSC) and thermal mechanical analysis (TMA) results show that the 5A (n=4)/3B system (methyl-substituted) has a softening temperature near 40° C., the 5A (n=4)/4B system (cyclohexyl-substituted) near 50° C., and the 5A (n=4)/5B system (phenyl-substituted) near 60° C. DSC measurements were unsuccessfully attempted on these three cured systems in order to observe the reverse Diels-Alder reaction. This failure suggests that either the reaction is not highly endothermic, or the reaction takes place over a wide temperature range and becomes indistinguishable from the baseline.

The use of small discrete monomers as described in the present invention allows achievement of a wide range of properties in the crosslinked networks and of a wide range of curing and depolymerization temperatures. It is very clear that networks can be made from more than a single bis (maleimide) and multifunctional furan. This increases the number of different materials that the method of the present invention can access.

EXAMPLES

Toluene, tetrahydrofuran, and ether were dried over CaH$_2$, then fractionally distilled. Furfuryl alcohol and triethylamine were dried over 4 Å molecular sieves, then fractionally distilled. Methyltrichlorosilane, cyclohexyltrichlorosilane, phenyltrichlorosilane, and 1,7-dichlorooctamethyltetrasiloxane were dried over CaH$_2$, and distilled.

Infrared spectra were obtained on a Perkin-Elmer FTIR spectrophotometer using NaCl plates (oils) or KBr pellets (solids). $^1$H and $^{13}$C nuclear magnetic resonance (NMR) spectra were acquired on a Bruker DRX-400 spectrometer in CDCl$_3$ or DMSO-d$_6$, 399.87 MHz and 100.55 MHz, respectively. Chemical shifts are reported in ppm relative to CDCl$_3$ (7.26 and 77.0) or DMSO-d$_6$ (2.50 and 39.5) as an internal standard. $^{13}$C solid state NMR spectra were obtained on a Bruker AMX-400 spectrometer at 100.62 MHz using standard cross polarization (CP) and single pulse (SP) techniques in conjunction with magic angle spinning. To verify peak assignments $^{13}$C interrupted coupling experiments were routinely conducted using optimum delay times of 80 microseconds. Thermal analysis experiments (DSC, TGA, and TMA) were conducted on a Perkin-Elmer series DSC-7, TGA-7, and TMA-7 with associated software. All thermal experiments were conducted under N$_2$ with a 10° C./min heating rate.

Example 1

Synthesis of Tris(furfuryloxy)cyclohexylsilane (4B)

Synthesis of tris(furfuryloxy)cyclohexylsilane, 4B, toluene (74 mL), furfuryl alcohol (31.0 mL, 359 mmol), and triethylamine (52.0 mL, 373 mmol) were added together in an oven-dried 500 mL three-neck flask equipped with a magnetic stir bar, reflux condenser, and addition funnel. To this rapidly stirred solution was added a solution of cyclohexyltrichlorosilane (20.0 mL, 113.2 mmol) and dry toluene (50 mL) dropwise via an addition funnel. After 10 minutes, an additional volume of toluene was added (100 mL) to facilitate stirring and the suspension stirred overnight (18 h). The suspension was triturated with diethyl ether (2×250 mL) and the insoluble triethylammonium hydrochloride removed via filtration. Solvent was removed under reduced pressure to leave the crude product which was purified by distillation (169–173° C. at 500 mTorr) to afford a light brown oil (43.0 g, 94.3%). Structural verification was determined by solution $^1$H and $^{13}$C NMR and FTIR, yielding the following: $^1$H NMR (CDCl$_3$) δ 7.38 (m, 3H, ArH), 6.32 (m, 3H, ArH), 6.25 (m, 3H, ArH), 4.72 (s, 6H, OCH$_2$), 1.68 (m, 4H, CH$_2$), 1.80 (m, 6H, CH$_2$); $^{13}$C NMR (CDCl$_3$) δ 153.6, 142.3, 110.2, 107.8, 57.5, 27.5, 26.7, 26.4, 22.9; FTIR (NaCl) μ 3149, 3121, 2926, 2850, 1603, 1504, 1449, 1373, 1357, 1278, 1226, 1197, 1152, 1067, 1015, 973, 920, 886, 856, 829, 744, 678, 629, 600, 476, 414 cm$^{-1}$. Other tris(furfuryloxy)silanes were made similarly.

Example 2

Synthesis of Tris(furfuryloxy)trimesate (2B)

Furfuryl alcohol (11.1 g, 0.113 mol) and Et$_3$N (11.4 g, 0.113 mol) were added to a stirring solution of THF (350 mL) at 0° C. 1,3,5-benzenetricarbonyl trichloride (10.0 g, 37.7 mmol) dissolved in 10 ml of THF was added dropwise over 1 minute. A white precipitate formed immediately and the reaction was warmed to room temperature and stirred overnight under N$_2$. The reaction was filtered through a sintered glass funnel and the solvent was removed in vacuo, resulting in a viscous yellow oil. The yellow oil was taken up in Et$_2$O (200 mL), filtered, and concentrated to yield 5B (15.3 g, 90%) as a pale yellow solid and was used without further purification. $^1$H NMR (400 MHz, CDCl3) δ 8.83 (s, 3H), 7.42 (s, 3H), 6.48 (s, 3H), 6.37 (s, 3H), 5.32 (s, 6H).

Example 3

General Procedure for Preparation of Compounds 4A and 5A

To a solution of dry THF was added either N-hydroxymethylmaleimide or 4-hydroxyphenylmaleimide (2 equivalents), Et$_3$N (2 equivalents) and the desired α,ω-dichloro(hexa or octa) methylsiloxane (1 equivalent). The reaction mixture was stirred at room temperature under N$_2$ for four hours. The reaction mixture was then filtered through a sintered glass funnel and the collected inorganic salts were washed with copious amounts of Et$_2$O. The solvent was removed in vacuo and the crude product was taken up in Et$_2$O, washed with distilled water (3x), dried (MgSO$_4$), filtered, and concentrated to yield the desired bis-maleimide as either an oil or a solid.

Example 4

Synthesis of Tetramethyl-bis[(N-maleimidomethyl)oxy]disiloxane 4A (n=2)

Following the general procedure of Example 3, N-hydroxymethylmaleimide (3.66 g, 28.8 mmol), Et$_3$N, (4.00 mL, 28.7 mmol), THF (50 mL), and 1,3-dichlorotetramethyldisiloxane (2.82 mL, 14.4 mmol) yielded 4A (n=2), (4.30 g, 78%) as a pale yellow solid. $^1$H NMR (400 MHz, CDCl$_3$) δ 6.74 (s, 4H), 5.12 (s, 4H), 0.13 (s, 12H).

Example 5

Hexamethyl-bis[(N-maleirnidomethyl)oxy]trisiloxane 4A (n=3)

Following the general procedure of Example 3, N-hydroxymethylmaleimide (4.99 g, 26.4 mmol), Et$_3$N (3.68 mL, 26.4 mmol), THF (150 mL), and 1,5-dichlorohexamethyltrisiloxane (3.60 mL 13.2 mmol) yielded 4A (n=3), (7.48 g, 97%) as a yellow oil. $^1$H NMR (400 MHz, CDCl$_3$) δ 6.73 (s, 4H), 5.11 (s, 4H), 0.13 (s, 12H), 0.10 (s, 6H).

Example 6

Octamethyl-bis[(N-maleimidomethyl)oxy]tetrasiloxane 4A (n=4)

Following the general procedure of Example 3, N-hydroxymethylmaleimide (212 mg, 1.66 mmol), Et$_3$N (232 μL, 1.66 mmol), THF (5 mL), and 1,7-dichlorooctamethyltetrasiloxane (290 μL, 0.833 mmol) yielded 4A (n=4) as a yellow oil. $^1$H NMR (400 MHz, CDCl$_3$) δ 6.73 (s, 4H), 5.11 (s, 4H), 0.13 (s, 12H), 0.08 (s, 12H).

Example 7

Hexamethyltrisiloxane-bis-1,7-(N-4-oxyphenylmaleimide) 5A (n=3)

Following the general procedure in Example 3, N-(4-hydroxyphenyl)-maleimide (22.83 , 0.120 mol), Et$_3$N (16.82 mL, 0.120 mol), THF (800 mL), and 1,5-dichlorohexamethyltrisiloxane (16.44 mL, 60.0 mmol), yielded 5A (n=3), (34.48 g, 98%) as clear brown oil. $^1$H NMR (400 MHz, CDCl$_3$) δ 6 7.01 (d, J=8.0 Hz, 4H), 6.82 (d, J=8.0 Hz, 4H), 6.64 (s, 4H), 0.10 (s, 12H), 0.02 (s, 6H); $^{13}$C NMR (100 MHz, CDCl$_3$) δ 169.6, 154.0, 134.0, 127.3, 124.6, 120.2, 0.8, –0.7.

Example 8

Octamethyltetrasiloxane-bis-1, 7-(N-4-oxyphenylmaleimide) 5A (n=4)

Following the general procedure in Example 3, N-(4-hydroxyphenyl)maleimide (4.50 g, 23.8 mmol), Et$_3$N (2.41 g, 23.8 mmol), THF (175 mL). and 1, 7-Dichloro-octamethyltetrasiloxane (4.18 g, 11.9 mmol) yielded 5B (n=4), (7.59 g, 97%) as a clear yellow-brown oil. The product was used without further purification. $^1$H NMR (400 MHz, CDCl$_3$) δ 7.17 (d, J=8.0 Hz, 4H), 6.96 (d, J=8.0 Hz, 4H), 6.82 (s, 4H), 0.25 (s, 12H), 0.10 (s, 12H); $^{13}$C NMR (100 MHz, CDCl$_3$) δ 169.7, 154.2, 134.1, 127.4, 124.6, 120.4, 0.9, –0.5.

Example 9

Formation of the Polymer Network

The curing reaction using compounds 5A (n=4) and 4B was performed as follows: In a 20 mL wide mouth polypropylene bottle were placed 4B, (0.828 g, 2.06 mmol), 5A (n=4), (2.03 g, 3.09 mmol), and a small magnetic stirbar. The viscous mixture was stirred vigorously at room temperature for 10–15 minutes, then heated in an oil bath at 60° C. The mixture gelled within 10 minutes. The gel was kept at 60° C. overnight (~16 h) then allowed to cool to room temperature to give a clear dark brown solid.

More preferred is the combination of resin 4B with the curing agent 5A (n=3). Testing has demonstrated thal. this combination gives a cured polymer network that does not readily crack and has a high softening temperature. Additionally, it is easily depolymerized with a wide range of solvents.

Example 10

Depolymerization Experiments

Solid pieces of the cured resins were stirred in N,N-dimethylacetamide (DMAC) and heated at 90° C. After roughly 1 hour, all systems were observed to have completely dissolved. These solutions very slowly gelled upon standing at room temperature for extended periods of time (more than a week). Printed circuit board components were encapsulated with the tris(furfuryloxy)cyclohexylsilane, 4B, and octamethyltetrasiloxane bis-1,7-(N-4-oxyphenylmaleimide) 5A (n=4), system and similarly de-encapsulated with no visible signs of damage to the electronic component.

Several experiments were performed where the 5A (n=3) and 4B components were mixed at room temperature and then heated at approximately 60° C. At this temperature, the mixture gels within 5–10 min. After a cured polymer network was obtained, the solid was then exposed to hot solvent at greater than 90° C. The polymeric network could be completely broken up and the sample dissolved, thus demonstrating removability for this crosslinked polymer network. A computer chip that was encapsulated and de-encapsulated using this procedure with no damage to the component. The crosslinked network could also be filled with glass micro-balloons (GMB) and decapsulated in a similar manner indicating that the filler, in this case GMB, played little role in either the gellation or depolymerization.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of making a thermally-removable encapsulant, comprising the steps of:

mixing at least one bis(maleimide) compound to at least one monomeric furan compound, said at least one monomeric furan compound selected from a group consisting of a tris(furan) and a tetrakis(furan), to form a mixture;

heating said mixture to a reaction temperature less than approximately 90° C. to form a gel; and cooling said gel to form a solid encapsulant wherein the solid encapsulant has the property that subsequent heating to a temperature greater than approximately 90° C. will depolymerize the solid.

2. The method of claim 1 wherein the at least one bis(maleimide) compound is a liquid at a temperature of approximately 60° C.

3. The method of claim 1 wherein the at least one monomeric furan compound is a liquid at a temperature of approximately 60° C.

4. The method of claim 1 wherein the solid encapsulant is formed within approximately 10 minutes.

5. The method of claim 1 wherein the at least one bis(maleimide) compound is selected from the group consisting of compounds $(C_4H_2O_2N)_2(CH_2)_6$, $((C_4H_2O_2N)C_6H_4)_2CH_2$, $((C_4H_2O_2N)C_6H_4)_2(SCH_2)_2$, $((C_4H_2O_2N)CH_2)_2(OSi(CH_3)_2)_2O$, $((C_4H_2O_2N)CH_2)_2(OSi(CH_3)_2)_3O$, $((C_4H_2O_2N)CH_2)_2(OSi(CH_3)_2)_4O$, $((C_4H_2O_2N)C_6H_4)_2(OSi(CH_3)_2)_3O$, and $((C_4H_2O_2N)C_6H_4)_2(OSi(CH_3)_2)_4O$.

6. The method of claim 1 wherein the at least one monomeric furan compound is selected from the group consisting of compounds $((C_4H_3O)CH_2O)_4(SiCH_3)_2$, $(((C_4H_3O)CH_2O)CO)_3C_6H_3$, $((C_4H_3O)CH_2O)_3SiCH_3$, $((C_4H_3O)CH_2O)_3SiC_6H_{11}$, $((C_4H_3O)CH_2O)_3SiC_6H_5$, and $((C_4H_3O)CH_2O)_4Si$.

7. The method of claim 1 wherein the solid encapsulant is depolymerized by dissolution in a polar solvent at a temperature greater than approximately 90° C.

8. The method of claim 7 wherein the polar solvent is selected from a group consisting of n-butanol, N,N-dimethylacetamide, methyl sulfoxide, and N,N-dimethylformamide.

9. The method of claim 1 wherein a filler is added to said mixture.

10. The method of claim 9 wherein the filler is glass micro-balloons.

11. A method of encapsulating an electronic component with a thermally-removable encapsulant, comprising the steps of:

mixing at least one bis(maleimide) compound to at least one monomeric furan compound, said at least one monomeric furan compound selected from a group consisting of a tris(furan) and a tetrakis(furan), to form a mixture;

heating said mixture to a reaction temperature less than approximately 60° C. to form a gel;

encapsulating an electronic component in said gel; and cooling said gel to form an solid encapsulant around said electronic component.

12. The method of claim 1 further comprising the step of removing the solid encapsulant, wherein the solid encapsulant is removed by heating the solid encapsulant to a temperature of greater than approximately 90° C.

13. The method of claim 12 wherein heating the solid encapsulant to a temperature of greater than approximately 90° C. is performed in the presence of a polar solvent.

* * * * *